Feb. 9, 1943.  M. SCHIFF  2,310,874
VARIABLE SPEED MOTOR
Filed July 11, 1940
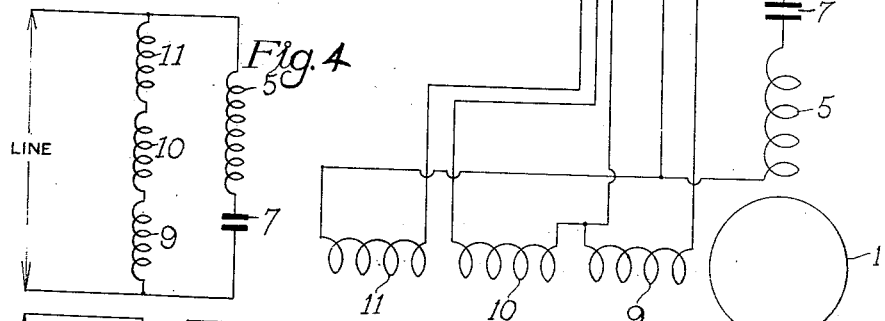
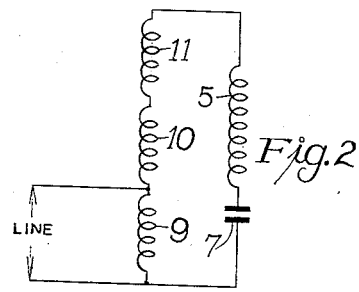
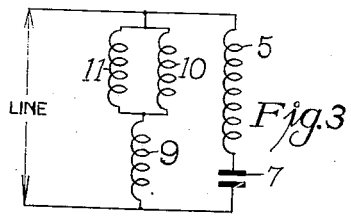
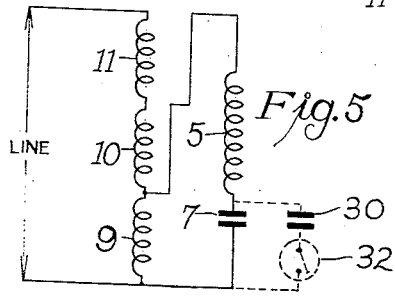
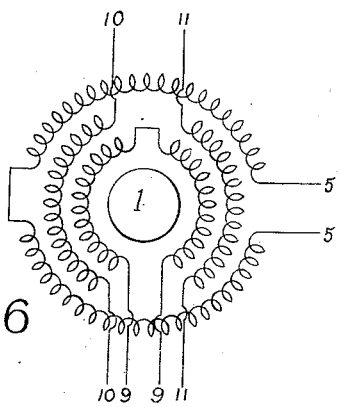
INVENTOR.
MARTIN SCHIFF
BY Roy M. Eilers
ATTORNEY.

Patented Feb. 9, 1943

2,310,874

UNITED STATES PATENT OFFICE 2,310,874

VARIABLE SPEED MOTOR

Martin Schiff, St. Louis County, Mo., assignor to Century Electric Company, St. Louis, Mo., a corporation of Missouri Application July 11, 1940, Serial No. 344,850

5 Claims. (Cl. 172—278)

This invention relates to variable speed motors and more particularly to induction motors of the capacitor start and run type. One well known form of starting device for a single phase induction motor is an auxiliary winding in which the current is displaced in phase from the current in the main or running winding. This phase displacement may be obtained by the insertion of a capacitor in the auxiliary winding. In the start and run type of motor, this auxiliary winding remains in the circuit after the motor has started.

There are certain applications where it is advantageous for motors of this type to be equipped to operate at various speeds. Thus in the fans of air-conditioning apparatus, such a motor is often necessary. There are, of course, many other applications for variable speed motors which need not be listed here. Various speeds can be obtained by the use of resistances or inductances to change the phase relationship between the main and the auxiliary windings. The present means of using these methods, however, results in inefficient operation of the motor because of the power loss in the resistances or inductances. In addition these devices are additions to the cost of the motor. Mechanical means for varying the speed are, of course, costly and complicated.

It is an object of my invention to provide an improved motor of the capacitor start run type equipped with means to operate it at various selected speeds. Further objects and advantages of my invention will appear from the following detailed description and from the accompanying drawing.

In accordance with my invention, one of the motor windings may be composed of a number of separate parts which may be variously connected to obtain various voltage ratios and thus different relationships between the fluxes in the auxiliary and main windings of the motor.

For the purpose of illustrating my invention, I set forth in the following description, in connection with the accompanying drawing, one form of my invention which I have found to operate satisfactorily.

Fig. 1 is a diagrammatic view of a motor and switch constructed according to my invention.

Fig. 2 is a schematic view showing the connection of the windings when the switch is in high speed position.

Fig. 3 is a schematic view showing the connection of the windings when the switch is in the intermediate speed position.

Fig. 4 is a schematic view showing the connection of the windings when the switch is in the low speed position.

Fig. 5 shows diagrammatically another method of connecting the windings to obtain a speed lower than that of Fig. 4.

Fig. 6 shows diagrammatically the distribution of the various windings.

Referring now to the drawing showing a motor diagrammatically, the rotor 1 may be provided with a short-circuited winding usually of the squirrel cage type, and the stator with a main or inducing winding and an auxiliary and starting winding 5. The current in the auxiliary winding 5 may be displaced electrically from the main winding by connection with a capacitor 7 or other device effective for the same purpose. The auxiliary winding may also be displaced 90° in space from the main winding as shown in Fig. 6. The main winding may be composed of three or more parts dependent on the number of speeds desired. I show the main winding composed of three parts 9, 10, and 11. A switch 13 may be provided to connect the windings as shown schematically in Figs. 2, 3, and 4. Fig. 2 shows the high speed connection of the windings which is obtained in the switch by moving contacts 15, 16, and 17 to engage contacts 24, 25, and 26. It can be seen that the line voltage is impressed upon part 9 of the main winding and a voltage greater than the line voltage would be induced in the total main winding by the transformer action between the windings and impressed on the auxiliary winding.

If the switch 13 is rotated so that contacts 15, 16, and 17 engage contacts 21, 22, and 23, the windings will be connected as shown in Fig. 3 where the line voltage is impressed across the auxiliary winding and a normal or line voltage is impressed upon both the auxiliary and the total main winding as connected. When the switch is rotated so that contacts 15, 16, and 17 engage contacts 18, 19, and 20, the windings are connected as shown in Fig. 4 with full line voltage across the auxiliary winding and full line voltage across the total main winding as connected.

Thus I have provided means for varying fluxes and the relation between them in the auxiliary and main winding. This varies the speed of the motor efficiently and without requiring external aids such as resistances or inductances. There is no electrical loss due to the use of such devices. The switch which I show is obviously diagrammatical, but any suitable switch to accomplish the result may be used.

In Fig. 6, I show one method of distributing the windings around the periphery of a motor. In order to simplify the description, I show here schematically a motor having only two poles. It will, of course, be obvious to those skilled in the art that this diagram can easily be applied to a motor with any number of poles. In this figure, the ends of each coil are marked with the same numeral used to designate the coils in Figs. 1–5. It can thus be seen that, even though the coils are connected in any of the manners shown, the current in the windings will always be balanced. Thus, in Figures 2, 4, and 5, the coils 10 and 11 are in series; the current through them will be equal; and on each pole of the motor, the ampere turns will be equal. When the coils are connected as shown in Fig. 3, the current through the coils 10 and 11 will be equal, and a balanced ampere turn condition will exist around the periphery of the motor. This method of uniformly distributing the windings at all speeds is advantageous over many of the present methods of varying speeds by depending on the omission of some of the coils, since it tends to permit quiet operation.

In Fig. 5 I show diagrammatically another connection of the coils which makes possible a fourth speed. The switch can be modified to make this connection if this additional speed, which is lower than that obtained by using the connection shown in Fig. 4, is desired.

It is often desirable when using the above method of obtaining various speeds to increase the starting torque of the motor. In Fig. 5, I show a method of obtaining a higher starting torque by inserting an additional capacitor 30 which may be of the electrolytic type in the circuit when the motor is started. A switch 32 effective to disconnect this condenser from the circuit after the motor has reached running speed is provided. This switch may be of the centrifugal or magnetic type well known in the art. For purposes of illustration, this starting aid is shown only on Fig. 5, although it is, of course, obvious that it may be connected across the condenser 7 shown in the other figures when desired.

Although I have shown but a single form of my invention, it will be obvious to those skilled in the art that various changes may be made without departing from the scope of the invention. I desire, therefore, that my invention shall not be limited except insofar as it is limited by the prior art and by the spirit of the appended claims.

I claim:

1. In an alternating current electric motor, a rotor, a stator, a plurality of slots in the rotor to receive windings, a main and auxiliary winding positioned in the slots, said windings being electrically displaced in phase from each other, the main winding being composed of three parts, each of the parts of the main winding having terminals, a switch to which the terminals of the parts of the main winding are connected, said switch being arranged such that in one position of the switch the line voltage is applied across one part of the main winding, all the parts are connected in series and the auxiliary winding is connected in parallel with the total main winding, in another position two parts of the main winding are connected in parallel and the third part in series with them with the line voltage across the total main winding and the auxiliary winding, and a third position in which the three parts of the main winding are connected in series with the line voltage across the total main winding, and the auxiliary winding is connected in parallel with the main winding, said parts of the main winding being disposed and arranged to provide a balanced flux condition for the rotor whenever the motor is in operation.

2. In an alternating current motor, a rotor, a stator, main and auxiliary windings disposed in slots in the stator, the auxiliary winding being electrically displaced in phase from the main winding, the main winding being divided into at least three parts, two of which are equal, said equal parts of the main winding being each uniformly distributed in symmetrical sections of the stator slots and the third part of the main winding being uniformly and symmetrically distributed in the same stator slots as said equal parts, and switch means for connecting the line voltage across the said third part of the main winding, and connecting the entire main winding including the two equal parts in series across the auxiliary winding whereby the main winding acts as an auto-transformer supplying a voltage to the auxiliary winding higher than the line voltage, said switch being arranged so all parts of the main winding are energized when the motor is in operation.

3. The arrangement claimed in claim 2 in which the switch means also connects the auxiliary winding across the line and connects the main winding across the line with the two equal parts in parallel with each other and both in series with the third part of the main winding.

4. In an alternating current motor, a rotor stator, a plurality of slots in the stator to receive windings, a main and auxiliary winding positioned in said slots, said auxiliary winding being electrically displaced in phase from the main winding, said main winding comprising at least three parts and being arranged so at least two of said parts are equal, each of the parts of said main winding having terminals, said auxiliary winding having one terminal connected to one of the equal parts of the main winding and having its other terminal connected to another of said parts of said main winding, a switch to which the terminals of the parts of the main windings are connected, said switch being arranged to connect the parts of the main winding in various parallel and series arrangements, and to apply the line voltage to the whole or a part of the main winding, whereby the voltage applied to the auxiliary winding may be varied with respect to the voltage across the main winding, said equal parts of the main winding being each uniformly distributed in symmetrical sections of stator slots and the rest of the main winding being uniformly and symmetrically distributed in the same stator slots as the two equal parts to provide a balanced flux condition in the rotor whenever the motor is in operation, and said windings and said switch being so arranged that all parts of the main winding are energized whenever the motor is in operation.

5. In an alternating current motor, a rotor, a stator, a plurality of slots in the stator to receive windings, a main and auxiliary winding positioned in the slots, a capacitor in series with the auxiliary winding, said main winding comprising at least three parts and being arranged so at least two of said parts are equal, said equal parts of the main winding being each uniformly distributed in symmetrical sections of the stator slots and the rest of the main winding being uniformly and symmetrically distributed in the same stator slots as the two equal parts, each of the said parts having terminals, said auxiliary winding having one terminal thereof connected to one of said equal parts and having its other terminal connected to another of the said parts, a switch to which the terminals of the parts of the main winding are connected, said switch being arranged to selectively connect the parts of the main winding in various parallel and series arrangements, whereby the line voltage may be applied to various parts of the main winding to vary the voltage on the auxiliary winding with respect to the counter E. M. F. generated in the main winding, said windings and said switch being so arranged that all parts of the main winding are energized whenever the motor is in operation.

MARTIN SCHIFF.